Figure 1:
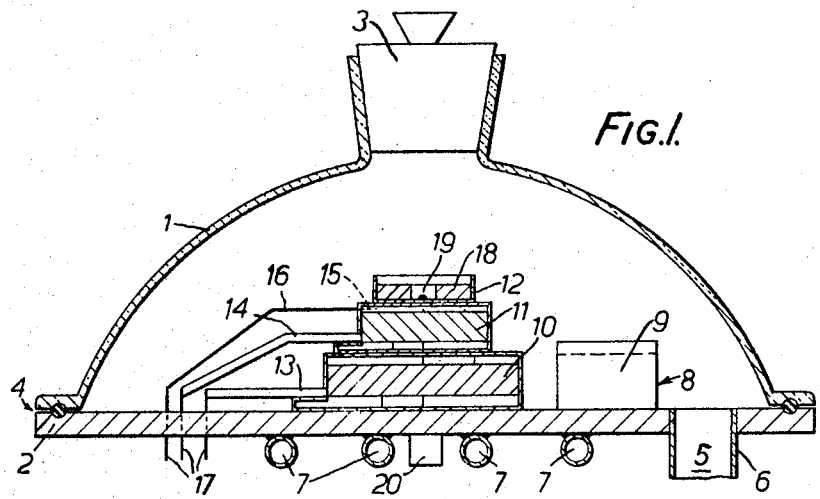

Aug. 9, 1966    A. G. E. PEARSE    3,264,746

FREEZE-DRYING

Filed April 23, 1964

ANTHONY G.E. PEARSE,
INVENTOR

BY
ATTORNEY

3,264,746
FREEZE-DRYING
Anthony Guy Everson Pearse, Letchmore Heath, England, assignor to Edwards High Vacuum International Limited, Crawley, England, a British company
Filed Apr. 23, 1964, Ser. No. 362,125
3 Claims. (Cl. 34—5)

This invention relates to freeze-drying and provides an improved method of and apparatus for freeze-drying particularly, though not exclusively, animal and vegetable tissue by use of thermo-electric couples.

In a known form of freeze-drying, a sample is frozen and then exposed to a vacuum. The ice in the sample sublimes and is removed from the vacuum system by direct pumping, by a refrigerated trap or by a desiccant. The latent heat of sublimation is usually supplied artificially although in some cases the sample may absorb heat naturally from its surroundings. For many freeze-drying applications an average temperature of the ice in the sample is about $-20°$ C. and there is little difficulty in maintaining this value. For tissue drying, a special form of freeze-drying primarily designed for treating small pieces of animal and vegetable tissue so that thin sections may be cut and prepared for chemical examination or for examination under the microscope, this being of great interest to cytologists, histologists and the corresponding chemists, it is often necessary to maintain the ice at a temperature between $-30°$ C. and $-50°$ C., and sometimes even lower. The nature and size of specimens of animal and vegetable tissue requiring freeze-drying is such that random heat gains from the surroundings may raise the temperature of the ice in a specimen above the required value on account of the small heat capacity of the specimens, unless special precautions are taken. Such precautions include the immersion of the evacuated drying vessel in a freezing bath, or supporting the specimen on a refrigerated platen. In the first case the refrigerant bath is known to contain solid carbon dioxide, or one of the liquefied gases or any suitable freezing mixture. The usual result of this treatment is that the specimen is maintained at a temperature too low for drying in a reasonably short time, such time being a few hours for a sample 1 mm. in thickness. Heat must therefore be applied to raise the ice in the specimen to the desired temperature. However, accurate measurement of the temperature of the specimen under these conditions is difficult if not impossible. The result is that to avoid the possibility of freeze-drying at too high a temperature and consequently spoiling the specimen which may be valuable and sometimes unique, drying is carried out at a low temperature over an unnecessarily long period of time of perhaps up to several days. In the second case the temperature of the support is usually maintained in equilibrium with heat gains from the room, or a heater, and heat losses to a trap cooled with solid carbon dioxide or one of the liquefied gases. Some difficulty is usually experienced in maintaining the support at a constant temperature, although if it is so maintained the specimen temperature may be inferred from the support temperature. If the specimen is made to adhere to the support using collodion, for example, the temperature of the ice in the sample may be assumed to be very close to that of the support. Both methods have the disadvantage of requiring a supply of refrigerant for the cold trap and its periodical replenishment. A conventional refrigerating system using a mechanical compressor is unnecessarily unwieldy and costly for the process.

The purpose of the present invention therefore is to provide a means of carrying out the freeze-drying of delicate tissue specimens free from the disadvantages inherent in known forms of apparatus. In the following description, by a couple is meant one pair of e.g. bismuth-telluride blocks, 1p and 1n type. A module is an assembly of couples (electrically in series and thermally in parallel) of a convenient size and fixed together between top and bottom plates.

According to the present invention freeze-drying apparatus includes one or more thermo-electric modules in one or more stages disposed within, or partly within, an evacuable chamber and operable by the Peltier effect to remove heat from, or supply heat to, a supporting surface within the chamber, means operable to remove volatile materials in the vapour phase, in particular water vapour, from the chamber, and cooling means located inside or outside the chamber operable to remove heat from the hot junctions of the thermo-electric module or modules when some or all of the thermo-electric modules are operating to extract heat from a sample or samples in contact with the supporting surface and reject heat to a portion or portions of the chamber adjacent the cooling means.

Preferably the means referred to for removing vapour is a desiccant. Alternatively the means for removing vapour may be a refrigerated surface cooled by one or more thermo-electric modules in one or more stages, or, in a second alternative, direct vacuum pumping.

The cooling means may be a water carrying pipe or pipes. Alternatively the cooling means may be an air cooled fin or fins located outside the chamber.

Some or all of the thermo-electric couples comprising the or each thermo-electric module may be bismuth-telluride p and n types. Advantageously all the thermo-electric couples have the same electrical resistance and are connected either in series or in parallel to a single power supply.

Freeze-drying apparatus may further include a thermostat operable to cut off the power supply to the thermo-electric module or modules when the cooling means is inadequate to maintain the portion or portions of the chamber adjacent the cooling means, to which the thermo-electric modules are rejecting heat, below a given temperature.

A method of freeze-drying a small sample of animal or vegetable tissue of small heat capacity using any one of the forms of apparatus according to the invention may include the steps of freezing the sample, introducing the sample to the evacuable chamber while resting on or surrounded by a wax or other impregnant contained in a cup which is placed on the supporting surface, sealing the chamber, reducing the pressure therein by a vacuum pump or pumps, controlling the temperature of the sample by the thermo-electric module or modules until it is dry and then supplying heat to the wax or other impregnant by reversing the current supply to one or more of the thermo-electric modules in order to effect the polymerisation, melting, or other thermal treatment of the impregnant or wax for embedding or impregnating the sample whilst still under vacuum.

Advantageously the pressure within the chamber is maintained substantially below 1 Torr during freeze-drying and the temperature of the frozen part of the sample is maintained at a value between −40° C. and −60° C.

Figure 2:
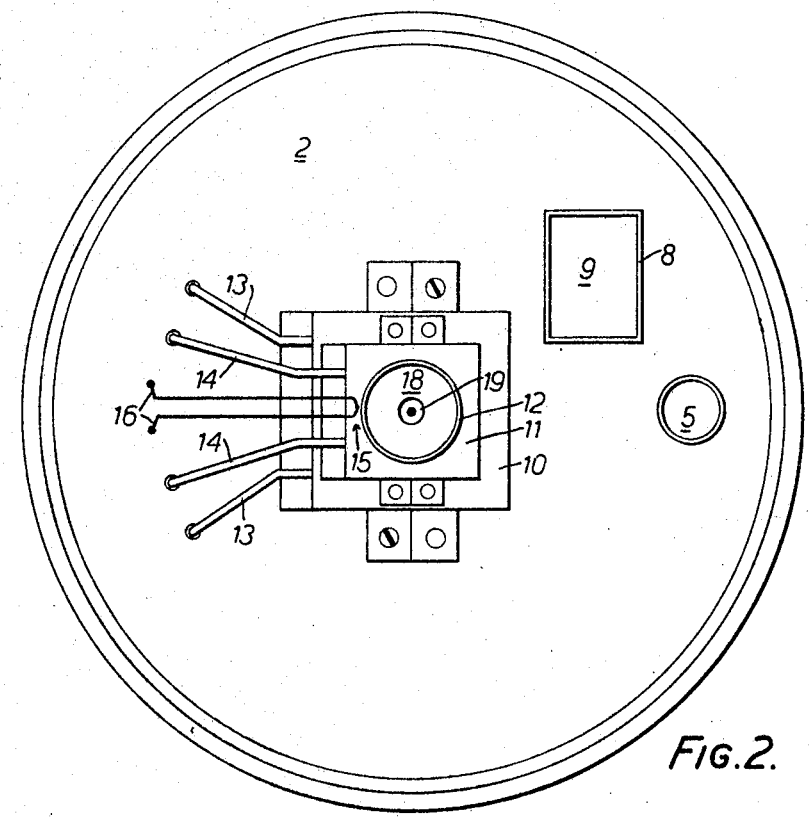

One form of apparatus for carrying out the invention will now be described in greater detail by way of example and with reference to the accompanying drawings in which:

FIGURE 1 represents a vertical section through a vacuum chamber embodying the elements of the invention; and FIGURE 2 represents a horizontal plan of the chamber viewed from above.

A conventional glass bell jar 1 fitted with a vacuum tight stopper 3 is mounted on a circular baseplate 2 sealed at 4 by means of an O ring trapped in a groove. The baseplate 2 is provided with an outlet port 5 attached to a two stage oil sealed rotary vacuum pump by pipeline 6. Beneath the baseplate 2 are provide water cooling coils 7 and a thermostat 20. Within the chamber resting upon the baseplate 2 is provided a jar 8 containing desiccant 9 which is phosphorus pentoxide. Adjacent this jar are placed two modules each consisting of thermo-electric couples of bismuth-telluride, p and n types, mounted with a first module 10 supporting a second module 11. All thermo-electric couples have the same electrical resistance and are connected in series to a single power supply (not shown in the drawings) by electrical leads 13 and 14 connected respectively to modules 10 and 11. A specimen container 12 rests on top of and in good thermal contact with module 11. A thermistor or thermo-couple temperature measuring element 15 inserted in a hole in the top plate of the top module 11 is supplied with electrical leads 16. Leads 13, 14 and 16 are brought through the baseplate 2 by vacuum tight electrodes 17. In order to obtain the lowest temperatures on the top surface there must be good thermal contact between the two modules and between the lower module and the base. This may be achieved by lapping the contacting surfaces and applying a thin film or grease filled with aluminium powder.

In a freeze-drying operation a sample is placed in the sample container 12 which contains previously degassed wax 18 formed with a hollow in the centre 19 exposing the base of the container. The sample is frozen by immersion in a Freon refrigerant, cooled to its freezing point by liquid nitrogen or liquid air, and is then placed in the hollow in the tissue container 12 which has been similarly cooled. The sample and container are then placed on the upper surface of the module 11 which has already been cooled to approximately −60° C. by passing a current through the thermo-electric modules. The bell jar 1 is replaced and the chamber evacuated below 1 Torr measured by a suitable vacuum gauge (not shown in the drawings) by a conventional vacuum pumping system. An electric current is passed through the junctions in modules 10 and 11 in such a direction that heat is removed from the upper surface of module 11 and transferred to the lower surface of module 10 by the Peltier effect. Excess heat thus transferred to the baseplate 2 is removed by the passage of water through the water cooling coils 7. By this method the ice in the sample is maintained at any desired temperature down to below −60° C. At the completion of freeze-drying the current in the thermo-electric modules is reversed and the sample and the wax surrounding it are heated. The wax melts and the sample becomes embedded without the vacuum seal having been broken. Once the sample is covered by wax the vacuum is broken and the wax is then reset by once more cooling the sample and wax by a reversal of the current. The sample is removed from the chamber and is ready to be sectioned and stained. The thermostat 20 is operatively connected to the power supply circuit so that should the cooling coils 7 fail for any reason to cool adequately the hot junctions of the couples comprising the bottom module 10, thus allowing them to be damaged by overheating, the power supply is cut off. Thus if the temperature of the baseplate 2 rises above approximately 40° C. the power supply to the modules is cut off.

The temperature of the specimen is governed by an equilibrium between heat conducted to or from the containers and heat radiated to or from the container and the walls of the chamber. The proportions of the container will determine the relative effects of the container and the chamber. In practice it is found best to make the container as shallow as possible, consistent with holding sufficient wax to embed the specimen.

In alternative arrangements of the apparatus, the chamber need not necessarily be a bell jar but may be any suitable evacuable chamber. A diffusion pump backed by a rotary pump may be used instead of a rotary pump alone. The cooling coils 7 may be replaced by air cooling fins or else by a conventional refrigerant for example ice, solid carbon dioxide or a conventional refrigerating cycle. Alternatively the cooling coils or their equivalent may be located inside the vacuum chamber. The desiccant jar 8 and desiccant 9 may be replaced by other means for removing water vapour for example direct vacuum pumping by a diffusion type pump or a refrigerated surface. This surface itself may be cooled by thermo-electric modules or alternatively by conventional refrigerants or even a combination of these two with or without a desiccant. The thermo-electric couples need not necessarily be of the same electrical resistance. Again the invention is not limited to any particular arrangement of the couples in stages. For example, the modules can be built in three stages, with one couple resting on four which in turn rest on sixteen. The specimen can then be placed on the second stage consisting of four couples and the top stage consisting of one couple used as a refrigerated condenser for water vapour. Likewise the invention is not limited to bismuth-telluride p and n type junctions but evisages the use of any suitable thermo-electric couple. In an alternative arrangement of the supply circuit the leads 14 may be replaced by internal connections between the top of the first module 10 and the bottom of the second module 11.

In alternative arrangements of the method of freeze-drying using the apparatus, the sample may be prefrozen by a number of known methods, for example by immersion in a Freon refrigerant cooled by liquid nitrogen or air. The sample container may contain a resin or wax or other impregnant but an impregnant is not essential and the sample container need not contain any such substances if it is not required to embed the dry sample at the completion of the drying process. For example the sample or samples may be placed directly on the top module 11 without any special container. Measurement of the pressure in the chamber may be effected by any suitable vacuum gauge.

Although the methods and apparatus according to the invention have been discussed with reference to such substances as animal and vegetable tissue, they are not limited to apply to such substances only, and are in fact equally applicable to small quantities of aqueous or non-aqueous suspensions or solutions, or to small samples of any materials containing water or other suitable volatile liquid. For example insects, butterflies, caterpillars, frogs, mice, small birds, flowers, fungi, fish, minerals, meteorites and mud from ocean beds.

I claim:

1. A method of freeze-drying a small sample of tissue of small heat capacity using a thermo-electric module disposed within an evacuable chamber and operable by the Peltier effect to produce heat exchange between the module and a tissue supporting surface within the chamber, the method including the steps of freezing the sample, introducing the sample to the evacuable chamber together with a wax contained in a cup member which is placed on the supporting surface, sealing the chamber, reducing the pressure in the chamber by a vacuum pump, controlling the temperature of the sample by the thermo-electric module until it is dry and then supplying heat to the wax by reversing the current supply to the thermo-electric module in order to effect melting of the wax so that the sample becomes embedded in the wax whilst still under vacuum.

2. A method of freeze-drying according to claim 1 in which the pressure within the chamber is maintained substantially below 1 torr during freeze-drying.

3. A method of freeze-drying according to claim 1 in which the sample is maintained at a temperature between −30° C. and −60° C.

References Cited by the Examiner

UNITED STATES PATENTS

| | | | |
|---|---|---|---|
| 2,307,802 | 1/1943 | Reichel | 34—5 |
| 2,494,541 | 1/1950 | Burr | 34—5 |
| 2,803,888 | 8/1957 | Cerletti | 34—5 |
| 3,009,258 | 11/1961 | Taylor | 34—5 |
| 3,096,163 | 7/1963 | Meryman | 34—5 |
| 3,151,465 | 10/1964 | Gelbutch | 62—3 |
| 3,169,049 | 2/1965 | Rey | 34—5 |
| 3,192,643 | 7/1965 | Rieutord | 34—5 |

WILLIAM J. WYE, *Primary Examiner.*